Jan. 18, 1966    Z. FABIAN    3,229,860
FEEDER WHEEL FOR SEED PLANTER
Filed Dec. 9, 1963    5 Sheets-Sheet 1
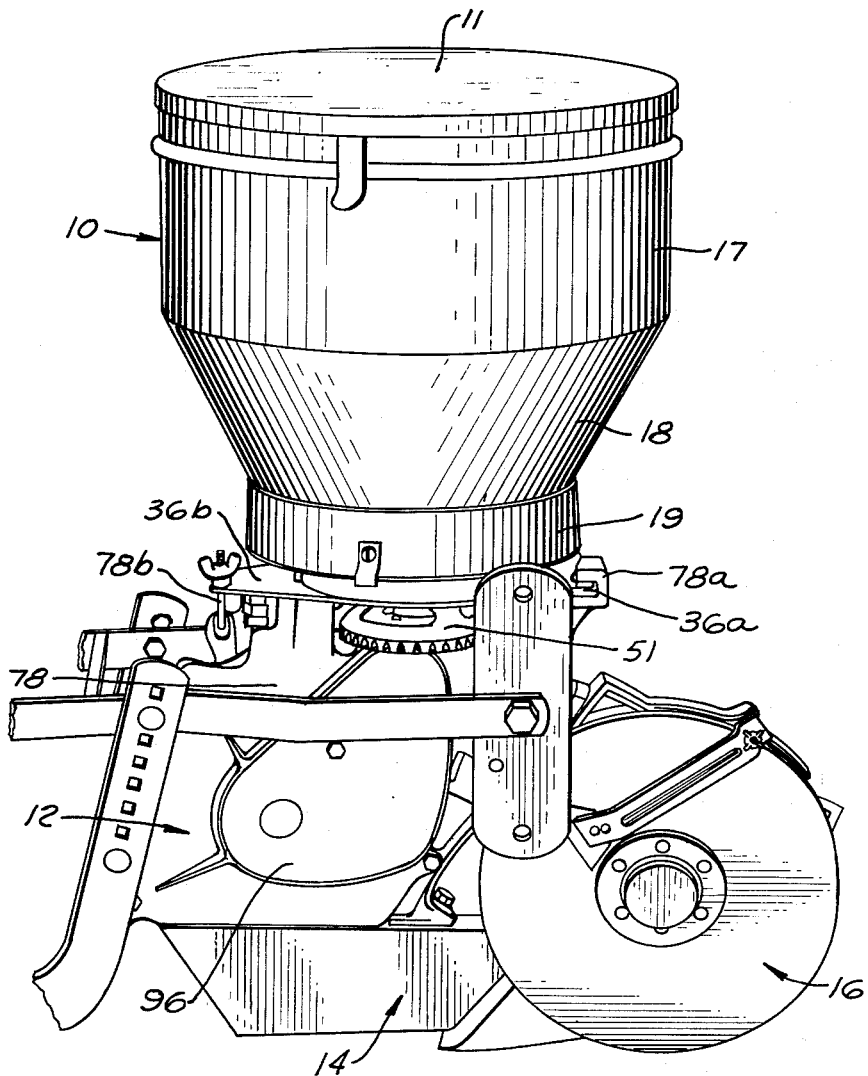
INVENTOR.
ZDENEK FABIAN
BY
Greist, Lockwood, Greenawalt & Dewey
ATTORNEYS

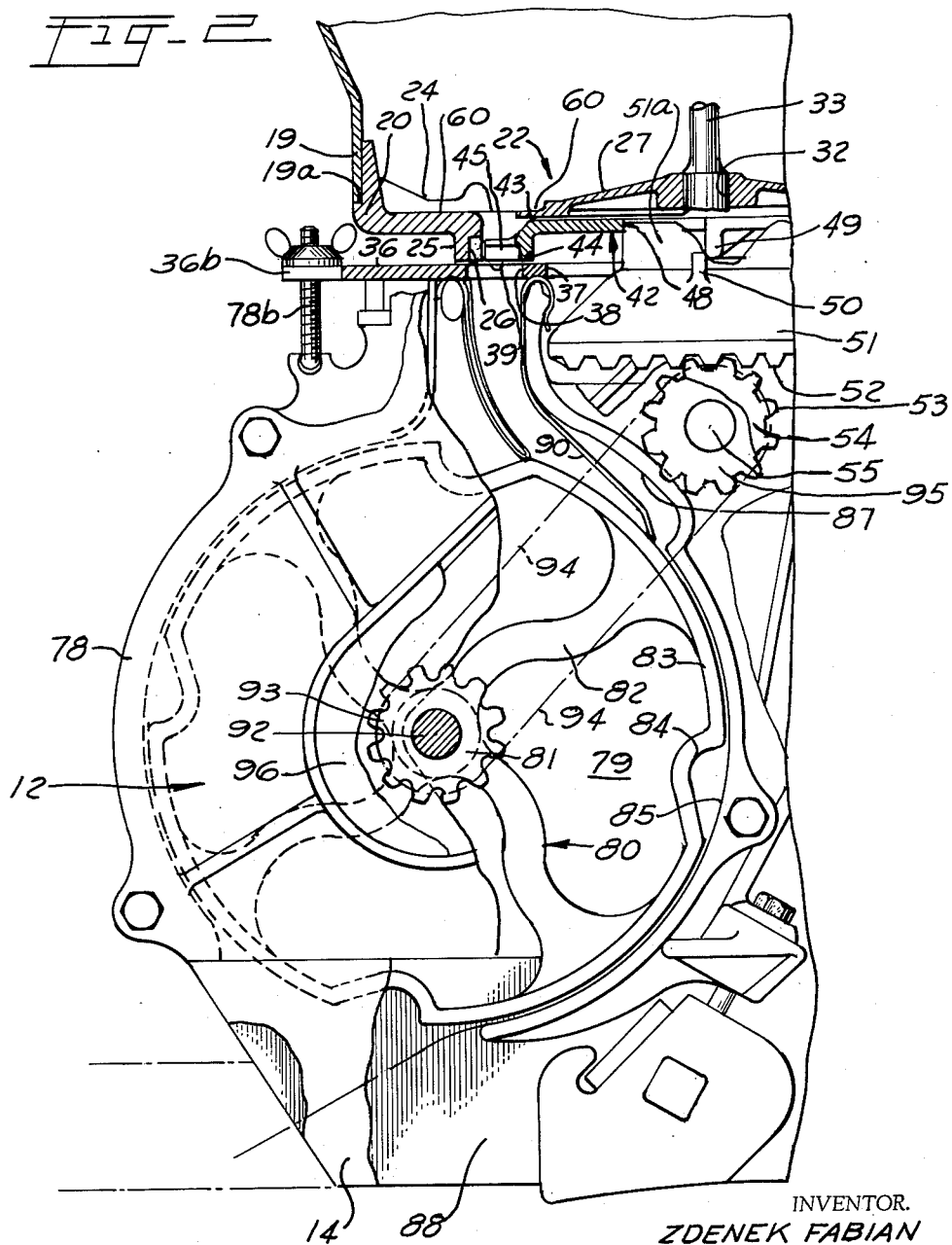

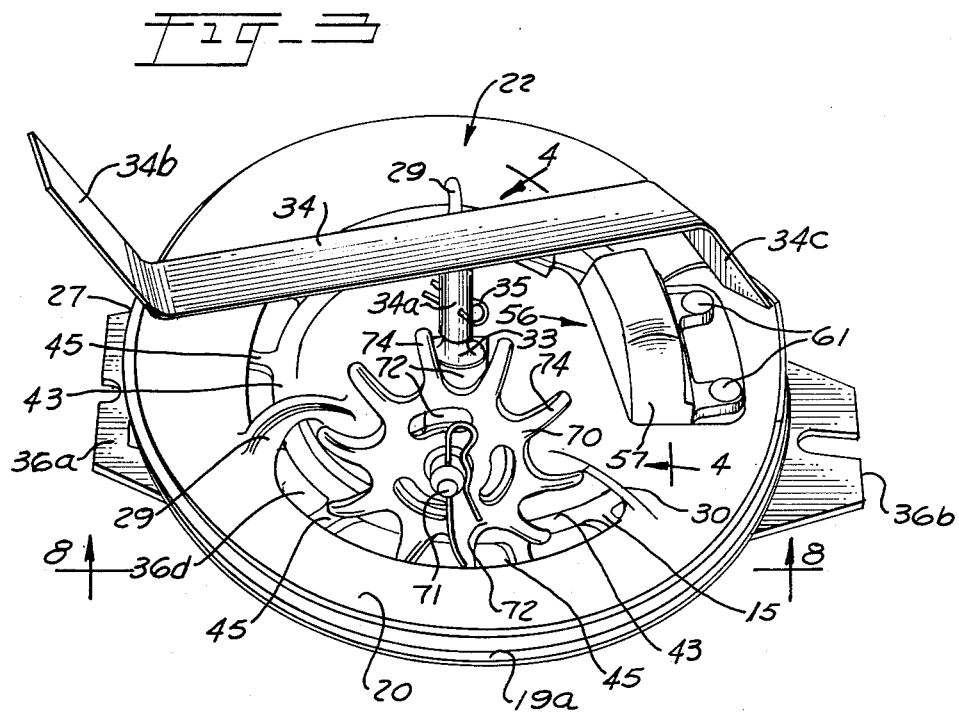
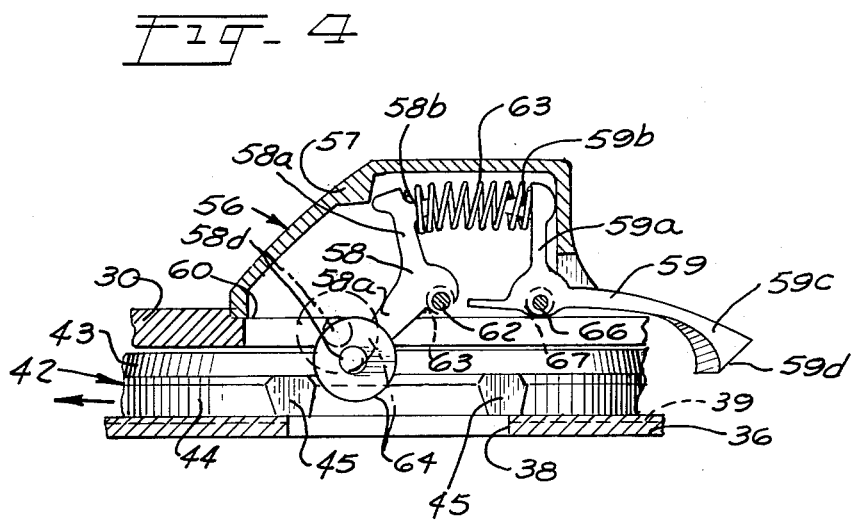

Jan. 18, 1966            Z. FABIAN            3,229,860
FEEDER WHEEL FOR SEED PLANTER
Filed Dec. 9, 1963            5 Sheets-Sheet 4
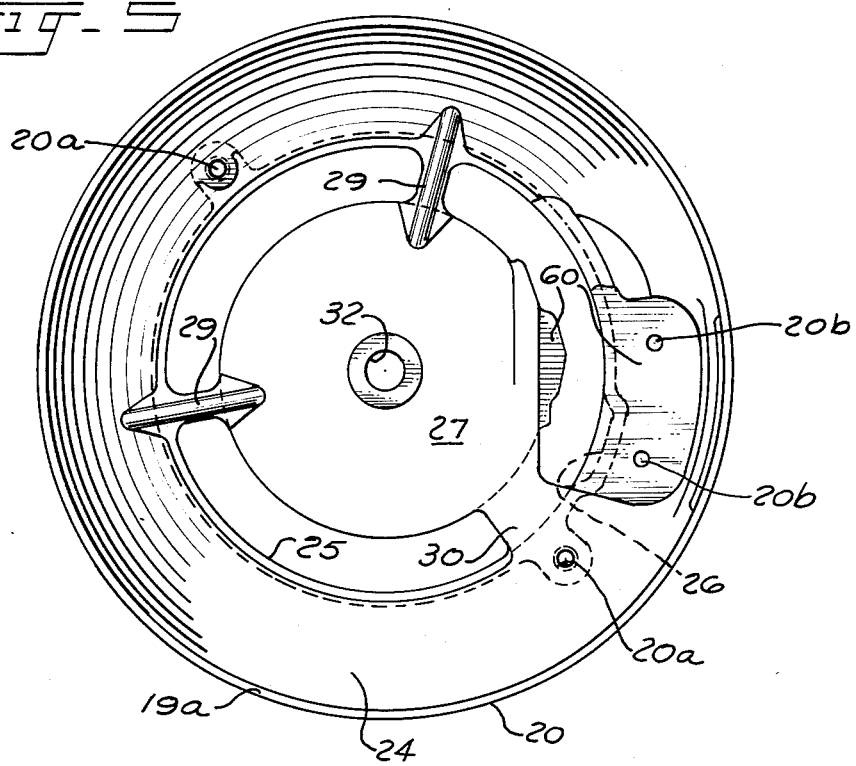
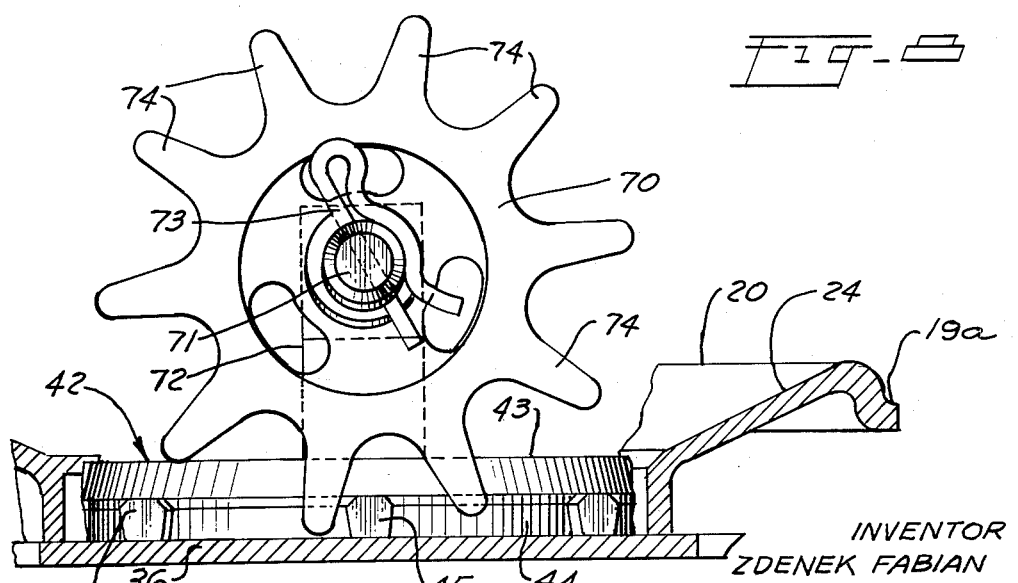
INVENTOR
ZDENEK FABIAN
ATTORNEYS Jan. 18, 1966   Z. FABIAN   3,229,860
FEEDER WHEEL FOR SEED PLANTER
Filed Dec. 9, 1963   5 Sheets-Sheet 5
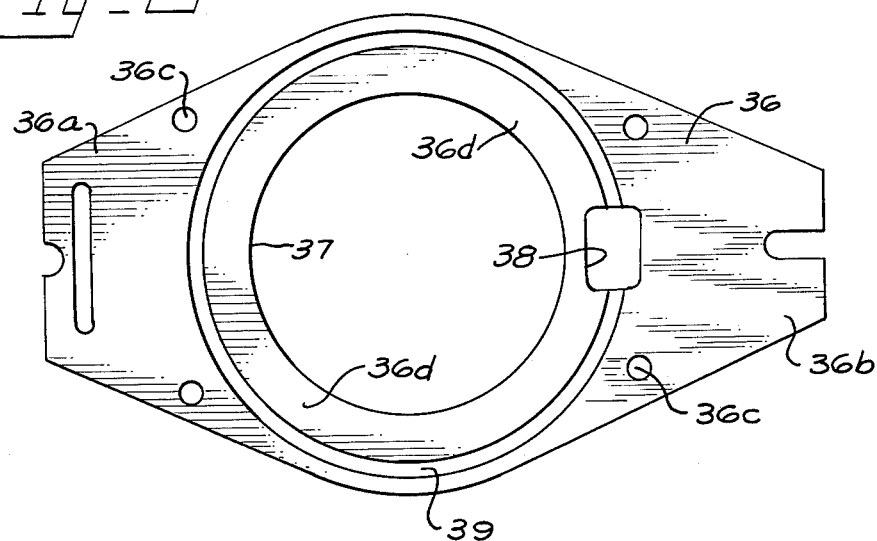
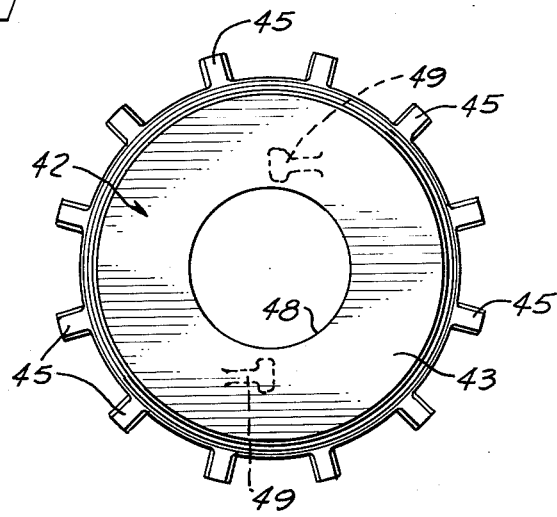
INVENTOR
ZDENEK FABIAN
BY
ATTORNEYS United States Patent Office 3,229,860
Patented Jan. 18, 1966

3,229,860
FEEDER WHEEL FOR SEED PLANTER
Zdenek Fabian, South Bend, Ind., assignor to Oliver Corporation, Chicago, Ill., a corporation of Delaware
Filed Dec. 9, 1963, Ser. No. 328,965
5 Claims. (Cl. 222—197)

This invention relates to agricultural implements and more particularly to new and improved means in a seed planter for holding and dropping a wide variety of types and sizes of seed.

As is known to those skilled in the art, most present day seed planters include a seed hopper having a seed plate rotatably mounted in its bottom for dispensing seed to some form of downwardly extending chute or the like which guides the seed to a furrow formed by the planter as the latter moves over a field to be planted. A number of different removable seed plates are provided for selective use in the hopper bottom, each seed plate being specially adapted to accommodate a particular type and/or size of seed. Most often one seed plate is provided for dispensing a particular linted seed, such as cotton seed, and a number of separate seed plates are provided for smooth seed such as corn, peas, soybean and horghum. It will be apparent that these prior art seed planters possess the disadvantages of requiring a number of separate different seed plates and of requiring changing of seed plates when a different type or size of seed is to be dispensed.

Accordingly, it is a primary object of the present invention to provide a new and improved means in a seed hopper whereby a substantial number of different types and/or sizes of seed may be handled without changing the seed plate.

It is another object of the present invention to provide in a seed hopper of the type having a rotatably mounted seed plate in the bottom thereof defining a plurality of seed cells movable in a circular path which passes over the discharge opening of the hopper, a feeder wheel in the hopper adapted to separate seed and to force into the cells for subsequent discharge through the discharge opening.

Even another object of the present invention is to provide unique but simple bottom construction for a planter seed hopper whereby a number of different types and/ or sizes of seed may be dispensed while using a single seed plate.

Still another object of the invention is to provide a hopper bottom of the type described which is adapted to cooperate with a seed wheel assembly.

These and other objects and advantages of the invention will become apparent from the following specification disclosing a preferred embodiment of the invention which is illustrated in the accompanying drawings.

In the drawings:

FIG. 1 is a fragmentary perspective view of a seed planter primarily illustrating the seed hopper, the seed wheel housing and the furrow opening means of the planter;

FIG. 2 is an enlarged, fragmentary, partial vertical longitudinal section and partial elevation (with certain parts being broken away or removed) of the planter unit of FIG. 1 primarily illustrating the hopper bottom and an associated seed wheel mechanism disposed beneath the hopper bottom;

FIG. 3 is a perspective view of the hopper bottom removed from the seed hopper;

FIG. 4 is an enlarged section taken along line 4—4 of FIG. 3 showing the knocker and cut-off assembly associated with the hopper bottom;

FIG. 5 is a top plan view of a casting forming a part of the hopper bottom;

FIG. 6 is a top plan view of a base plate of the hopper bottom;

FIG. 7 is a top plan view of the seed plate of the hopper bottom; and

FIG. 8 is an enlarged fragmentary section taken along line 8—8 of FIG. 3.

Referring now to the drawings, the seed planter unit illustrated in FIGS. 1 and 2, will be seen to include a seed hopper 10 having a detachable cover 11, a seed wheel assembly 12, a runner 14 and a disc furrow opener 16. It will be understood that a planter will include a plurality of the units illustrated for simultaneously planting a number of rows of seed as the planter is drawn over a field in a direction from left to right as seen in FIGS. 1 and 2.

Hopper 10 essentially includes a hopper wall structure including an upper cylindrical portion 17 (FIG. 1), an adjacent intermediate conical portion 18 joining with a lower cylindrical portion 19 which fits on an annular ledge 19a on a casting 20 forming a part of the hopper bottom assembly, generally designated 22. Casting 20 includes a generally dished bottom portion 24 from the inner edge of which depends an integral flange 25. Flange 25 is continuous and is circular in shape except for a short portion 26 (FIG. 5). Casting 20 also includes a central generally circular portion 27 connected with portion 24 of the casting by means of integral arcuate legs 29 and an integral web portion 30. Circular portion 27 includes a central aperture 32 rotatably receiving a vertically extending shaft 33 which is received in a hollow hub 34a of an agitator arm 34 (FIG. 3) having one end 34b upturned and the other end 34c downturned. A cotter pin 35 received in aligned openings in shaft 33 and hub 34a detachably mounts the agitator arm on the shaft for rotation with the latter.

Bottom assembly 22 includes a horizontally extending plate 36 having diametrically oppositely disposed ear portions 36a and 36b adapting the plate to be secured in place as will be explained below. Plate 36 is secured to the underside of casting 20 in contact with the edge of flange 25 by fasteners (not shown) which extend through bores 36c and threadingly engage threaded bores 20a in the casting. Plate 36 includes a central opening 37 concentric with flange 25 of casting 20 but smaller in diameter than the inside diameter of flange 25 for defining an annular surface 36d (FIG. 6) extending inwardly from flange 25. Plate 36 is provided with a discharge opening 38 in the portion thereof defining the annular surface.

As noted in FIG. 6, annular surface 36d is continuous except for the portion thereof interrupted by the discharge opening. Preferably, annular surface 36d is provided with a circular groove 39 for assisting in guiding seeds in a circular path as will be explained hereinbelow. It will be understood that when plate 36 is secured to casting 20 in the manner described, the outer edge of discharge opening 38 lies directly under the inner surface of recess 26 (FIG. 5) of flange 25.

Bottom assembly 22 further includes a circular seed plate 42 (FIG. 7) defined by a central circular hub portion 43 which includes a downwardly extending continuous cylindrical flange 44 (FIG. 2). Integral with hub portion 43 are a plurality of peripherally disposed, equally spaced-apart, radially extending teeth or lugs 45 which have planar bottom surfaces co-planar with the bottom surface of flange 44. Seed plate 42 is adapted to rotate about its vertical central axis by sliding movement of the bottom surfaces of teeth 45 and flange 44 on annular surface 36d. Hub portion 43 of the seed plate is housed just beneath circular portion 27 of casting 20 with the outer ends of teeth 45 disposed in close spaced relation with the inner surface of annular flange 25. Teeth 45 define therebetween a plurality of seed cells.

The seed plate includes a central opening 48 in the hub portion thereof. Integral with the seed plate adjacent the periphery of opening 48 therein are a suitable number of depending lugs 49 (FIGS. 2 and 7) which are adapted to abut complementary shaped lugs 50 extending upwardly from the conical shaped portion of a seed plate gear 51. Gear 51 includes an integral upstanding hub portion 51a (partially broken away in FIG. 2 to show one of the lugs 49 on the seed plate) which is snugly received in opening 48 in the seed plate thereby mounting the latter in concentric relation with gear 51.

Gear 51, which is suitably mounted on the housing of seed wheel assembly 12 for rotation about a vertical axis, has an annular series of teeth 52 adapted to mesh with teeth 53 on a drive gear 54, the drive gear being supported for rotation about a horizontal axis defined by its supporting shaft 55. This shaft is suitably journalled in the housing of seed wheel assembly 12. It will be understood that shaft 55 is driven or rotated by suitable power take-off means (not shown) forming a part of the planter, so that gear 54 may be rotated when the planter is being drawn over a field, for example.

Rotation of drive gear 54 produces rotation of gear 51 which in turn brings about rotation of the seed plate by abutting engagement of lugs 49 and 50. Rotation of gear 51 also results in rotation of shaft 33 for operation of agitator 34. In FIG. 2, shaft 33 is shown broken away at the lower portion thereof and hub portion 51a of gear 51 is broken away for better illustration of the engagement between lugs 49 and 50. It will be understood that shaft 33 is supported from drive gear 51 by suitable means (not shown) for rotation of shaft 33 with gear 51. Shaft 33 rotates in aperture 32 of casting 20 and holds the latter in concentric relation with gear 51 and seed plate 42.

A knocker and cut-off assembly, generally designated 56 (FIGS. 3 and 4), is secured to casting 20 over discharge opening 38 in plate 36 for knocking seeds from the seed cells downwardly through the discharge opening. Assembly 56, which of itself forms no part of the present invention, is not illustrated in FIG. 2 for more clearly showing the casting and seed plate.

Knocker and cut-off assembly 56 includes a housing 57 which contains a knocker member 58 and a cut-off member 59. The bottom portion of housing 57 is received in a planar recess 60 formed partially in bottom portion 24 and partially in central portion 27, and housing 57 is secured in this recess by fasteners 61 which extend through suitable openings in housing 57 and openings 20b (FIG. 5) in portion 24 of the casting.

Knocker member 58 includes a pair of oppositely disposed integral pin portions 62 which extend transversely of the knocker and are journalled in respective journals formed by the surface of recess 60 and by U-shaped openings 63 in the bottom edge of housing 57. By reason of this mounting member 58 is adapted for limited pivoting movement within housing 57 about an axis defined by pin portions 62.

Knocker 58 has an upwardly extending arm portion 58a having a small integral knob 58b extending into one end of a coil spring 63. The knocker member further includes a depending arm portion 58c having an integral pin 58d extending from one side thereof for rotatably mounting a roller 64. Under the influence of spring 63, roller 64 rolls over the upper surfaces of moving teeth 45 for knocking or thumping seed from the seed cells into discharge opening 38.

Cut-off member 59 includes an upwardly extending arm portion 59a having an integral knob 59b extending into the other end of coil spring 63. The cut-off member includes a pair of oppositely disposed integral pin portions 66 extending transversely of member 59 and received in respective journals formed by the surface of recess 60 and by U-shaped openings 67 in the bottom edge of housing 57. By this construction member 59 is mounted for limited pivoting movement within the housing about an axis defined by pin portions 66. Cut-off member 59 also includes an arm portion 59c having an inclined face 59d on its outer end which is adapted to engage and slide over or wipe the upper surface of teeth 45 for preventing excess seed in the seed cells from being carried to discharge opening 38.

Bottom assembly 22 further includes a novel feeder wheel 70 which is mounted for rotation about a generally horizontal axis provided by a pin 71 which is supported from one end of a strap bracket 72. The other end of bracket 72 is apertured for receiving shaft 33 and is suitably secured on circular portion 27 of casting 20 around aperture 32. Feeder wheel 70 is maintained on pin 71 by a cotter pin 73. As is apparent from FIGS. 3 and 8, feeder wheel 70 is generally vertically disposed and mounted over the circular path of movement of the seed cells defined by teeth 45 of the seed plate. The feeder wheel includes a plurality of equally spaced-apart, radially extending fingers 74, which fingers are adapted to be engaged by teeth 45 of the seed plate. This engagement between the seed plate teeth and the feeder wheel fingers causes rotation of the feeder wheel upon rotation of the seed plate.

The function of feeder wheel 70 is two-fold: first, fingers 74 of the rotating feeder wheel, which are directly exposed to the contents of hopper 10, separate seed in the hopper in the area of the feeder wheel which is especially important when a linted type of seed, such as cotton seed, is being planted; second, the action of feeder wheel fingers 74 projecting into the seed cells forces the loosened or separated seed in the area of the feeder wheel into the seed cells.

It will be understood that seed plate 42 rotates in a clockwise direction as viewed in FIG. 3. Accordingly, feeder wheel 70 acts to separate seed and force the seed into the seed cells where the seed is then carried in an arcuate path to discharge opening 38 for downward ejection therethrough by means of knocker 58. By providing the feeder wheel of this invention it has been found that a wide variety of linted types of seed, such as cotton seed, may be handled in the seed hopper without substituting different seed plates for seed plate 42. This is primarily brought about by the action of feeder wheel 70 in separating or loosening linted type seed and forcing almost any type and/or size of seed into the moving seed cells before they approach the knocker and cut-off assembly. It may be desired to substitute seed plates having different sized seed cells to provide different seeding rates, for example.

If it is desired to plant non-linted seeds, i.e., smooth skinned seeds such as corn or beans, feeder wheel 70 and agitator 34 are removed from the hopper. These two members may be easily and quickly detached from their supporting members by removing cotter pins 35 and 73 and sliding agitator 34 and feeder wheel 70 from shaft 33 and pin 71, respectively.

The hopper bottom construction of this invention is adapted to cooperate with a seed wheel assembly 12 (FIGS. 1 and 2), commonly known as a hilldrop wheel, of the type disclosed and claimed in the co-pending Brandt et al. application Serial No. 268,921, filed March 29, 1963. This seed wheel assembly 12 is mounted beneath the bottom assembly of the hopper for receiving seed from the discharge opening, for accumulating the seed in clusters or hills, and for guiding the clusters of seed downwardly for deposit in the furrow formed by the seed planter.

The seed wheel assembly includes a housing 78 having a narrow circular chamber 79 rotatably supporting a seed wheel 80. Housing 78 is configured at its upper portion for supporting plate 36 from the underside of the latter. Plate 36 and the hopper are detachably secured to housing 78 by inserting ear 36a under an integral housing lip 78a (FIG. 1) and by connecting a fastener 78b carried by housing 78 with slotted ear 36b of plate 36.

The seed wheel includes a hub portion 81 having a number of spokes 82 supporting a rim 83 formed with a number of equally spaced seed-receiving pockets 84. Housing 78 includes a narrow vertically extending wall portion 85 arcuately shaped along the length thereof for uniform close spaced relation with a portion of the periphery of the seed wheel thereby to hold seed in pockets 84 during movement of the seed from inlet passageway 87 to outlet passageway or area 88.

Inlet passageway 87, which is defined by a portion of housing 78, includes a wiper arm or blade 90 for forcing seed into seed-receiving pockets 84 of the seed wheel. The operation of wiper arm 90 and the operation of seed wheel 80 are fully disclosed in the Brandt et al. application referred to above.

It will be understood that when hopper bottom assembly 22 is attached in place on housing 78, discharge opening 38 of plate 36 is disposed directly over the mouth of inlet passageway 87.

Hub portion 81 of the seed wheel is mounted on a pin 92 journalled in housing 78, and a gear 93 is mounted on pin 92 adjacent hub 81 for rotation with the latter. A chain 94 (diagrammatically illustrated) is trained over gear 93 and a gear 95 mounted on shaft 55 for providing rotation of seed wheel 82 upon rotation of the shaft. Gears 54 and 95 are spaced along shaft 55. Gear 54 meshes with teeth 52 on the far side of gear 51 as seen in FIG. 2 and gear 95 is disposed adjacent the near side of gear 51 but of course does not engage the teeth of the latter. Gears 93, 95 and chain 94 are enclosed within a housing portion having a removable cover plate 96.

With a gear 93 of given size, the rate of rotation of seed wheel 82 relative to the drive gear (and accordingly relative to seed plate 42) is fixed at a predetermined value. The rate of rotation of the seed wheel relative to the rate of rotation of the seed plate may be varied by changing the size of gear 93. Preferably, the relative rate of rotation between the seed plate and seed wheel is such that the seed plate rotates at a rate sufficient periodically to discharge in timed relation the number of seeds desired to be received in the seed-receiving pockets of the seed wheel. For example, if it is desired to dispense seeds in clusters or hills of three seeds, suitable gearing between the seed plate and seed wheel is provided so that three seeds are discharged through discharge opening 38 for every quarter revolution of the seed wheel, i.e., if four pockets are provided in the seed wheel. By controlling the relative rate of rotation between the seed plate and seed wheel, the desired number of seeds are always waiting in inlet passageway 87 for being received in one of the seed-receiving pockets thereby avoiding jamming or stuffing of inlet passageway 87 and erratic functioning of the seed wheel during operation of the planter.

While the invention has been shown in but one form it will be obvious to those skilled in the art that it is not to be so limited, but on the contrary it is susceptible of various changes and modifications without departing from the spirit and scope of the appended claims.

I claim:

1. In a seed hopper of the type having a substantially circular bottom with a peripherally disposed discharge opening therein, the combination of a horizontally disposed circular seed plate mounted just above said bottom for rotation about the vertical central axis of the former, said seed plate having peripherally spaced means defining a plurality of seed cells movable along a circular path which passes over said opening, a feeder wheel mounted in said hopper so as to be directly exposed to the contents thereof, said feeder wheel being disposed above said path and in horizontal spaced relation from said opening, said feeder wheel having a plurality of peripherally disposed, generally radially extending fingers, said feeder wheel being rotatably mounted with one or more of the lowermost fingers thereof extending into one of said cells, whereby upon rotation of said seed plate said fingers successively enter said cells to force seed into said cells for subsequent discharge through said opening.

2. In a seed hopper of the type having a substantially circular bottom with a peripherally disposed discharge opening therein, the combination of a horizontally disposed circular seed plate mounted just above said bottom for rotation about the vertical central axis of the former, said seed plate having a plurality of peripherally disposed, radially extending teeth defining therebetween a plurality of seed cells movable along a circular path which passes over said opening, a feeder wheel rotatably mounted in said hopper so as to be directly exposed to the contents thereof, which feeder wheel is generally vertically disposed above said path and in horizontal spaced relation from said opening, said feeder wheel having a plurality of peripherally disposed, generally radially extending fingers with one or more of the lowermost fingers projecting into the cells between said teeth so that engagement of the latter with the fingers causes rotation of the feeder wheel upon rotation of the seed plate, whereby the feeder wheel separates seed in the hopper and forces seed into said cells for subsequent discharge through said opening.

3. In a seed hopper of the type having a substantially circular bottom with a peripherally disposed discharge opening therein, the combination of a horizontally disposed circular seed plate mounted just above said bottom for rotation about the vertical central axis of the former, said seed plate having a plurality of peripherally disposed, radially extending teeth defining therebetween a plurality of seed cells movable along a circular path which passes over said opening, a feeder wheel rotatably mounted in said hopper so as to be directly exposed to the contents thereof, which feeder wheel is generally vertically disposed above said path and in horizontal spaced relation from said opening, said feeder wheel having a plurality of peripherally disposed, generally radially extending fingers with one or more of the lowermost fingers projecting into the cells between said teeth so that engagement of the latter with the fingers causes rotation of the feeder wheel upon rotation of the seed plate, whereby the feeder wheel separate seed in the hopper and forces seed into said cells, and knocker means mounted in said hopper above said path and over said opening for knocking seed from said cells and into the opening.

4. In a seed planter, the combination of a seed hopper having a substantially circular bottom with a peripherally disposed discharge opening therein, a horizontally disposed circular seed plate mounted just above said bottom for rotation about the vertical central axis of the former, said seed plate having peripherally spaced means defining a plurality of seed cells movable along a circular path which passes over said discharge opening, a feeder wheel mounted in said hopper so as to be directly exposed to the contents thereof, which feeder wheel is disposed above said path and in horizontal spaced relation from said opening, said feeder wheel having a plurality of peripherally disposed, generally radially extending fingers arranged for successive entry into said cells upon rotation of the seed plate thereby to separate seed in the hopper and to force seed into said cells, knocker means mounted in said hopper above said path and over said opening for knocking seed from said cells and into said opening, housing means rotatably supporting a vertically disposed seed wheel beneath said hopper, said housing means including means defining a vertically extending passageway connecting said opening with the periphery of said seed wheel near the upper portion thereof, said seed wheel having a plurality of peripherally spaced seed-receiving pockets, and drive means connecting said seed plate with said seed wheel for regulating the rate of rotation of the former relative to the latter thereby to control the quantity of seed received in the pockets of the seed wheel.

5. In a seed hopper of the type including a substantially circular bottom with a peripherally disposed discharge opening therein, a horizontally disposed circular seed plate mounted above said bottom for rotation about the vertical central axis of the former, which seed plate has peripherally spaced means defining a plurality of seed cells movable along a circular path which passes over said opening, knocker means mounted in the hopper over said path and above said opening for knocking seed from the cells and into the opening, the improvement which comprises, a feeder wheel mounted in said hopper so as to be directly exposed to the contents thereof, which feeder wheel is disposed above said path and in substantial horizontal spaced relation from said opening, said feeder wheel having a plurality of peripherally disposed, generally radially extending projections, said feeder wheel being rotatably mounted with one or more of the projections thereof extending into one of said cells, whereby upon rotation of the seed plate said projections successively enter said cells to force seed into said cells for subsequent discharge through said opening.

References Cited by the Examiner
UNITED STATES PATENTS

| | | | |
|---|---|---|---|
| 133,911 | 12/1872 | Wilson | 222—227 |
| 140,493 | 7/1873 | Fulghum et al. | 222—220 |
| 930,106 | 8/1909 | Towle | 222—223 |
| 1,236,519 | 8/1917 | White | 222—223 X |
| 1,735,077 | 11/1929 | Files | 222—346 X |

M. HENSON WOOD, JR., *Primary Examiner.*

LOUIS J. DEMBO, *Examiner.*

UNITED STATES PATENT OFFICE
CERTIFICATE OF CORRECTION

Patent No. 3,229,860 January 18, 1966

Zdenek Fabian

It is hereby certified that error appears in the above numbered patent requiring correction and that the said Letters Patent should read as corrected below.

Column 1, line 24, for "horghum" read -- sorghum --; line 40, after "force" insert -- seed --; column 2, line 24, after "short" insert -- recess --; column 6, line 48, for "separate" read -- separates --.

Signed and sealed this 13th day of December 1966.

(SEAL)

Attest:

ERNEST W. SWIDER
Attesting Officer

EDWARD J. BRENNER
Commissioner of Patents